US006632383B1

(12) United States Patent
Peet

(10) Patent No.: US 6,632,383 B1
(45) Date of Patent: Oct. 14, 2003

(54) METHOD FOR PRODUCING IMPROVED POLYMERIC FILMS

(75) Inventor: Robert G. Peet, Pittsford, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 398 days.

(21) Appl. No.: 09/667,138

(22) Filed: Sep. 21, 2000

Related U.S. Application Data

(63) Continuation-in-part of application No. 09/310,223, filed on May 12, 1999, now abandoned.

(51) Int. Cl.$^7$ .............................................. B29C 47/06
(52) U.S. Cl. ................................ 264/46.1; 264/173.13; 264/173.16; 264/173.19
(58) Field of Search ...................... 264/173.19, 173.13, 264/173.16, 46.1, 331.14, 288.8

(56) References Cited

U.S. PATENT DOCUMENTS

| | | | |
|---|---|---|---|
| 3,753,769 A | 8/1973 | Steiner .................. 117/122 H |
| 4,214,039 A | 7/1980 | Steiner et al. ............. 428/414 |
| 4,377,616 A | 3/1983 | Ashcraft et al. ........... 428/213 |
| 4,447,494 A | 5/1984 | Wagner et al. ............. 428/349 |
| 4,632,869 A | * 12/1986 | Park et al. ............... 428/315.5 |
| 4,753,995 A | 6/1988 | Chu et al. ................... 525/199 |
| 4,829,116 A | 5/1989 | Piesold ....................... 524/278 |
| 4,865,908 A | 9/1989 | Liu et al. .................... 428/248 |
| 4,904,735 A | 2/1990 | Chapman et al. ........... 525/199 |
| 4,931,499 A | 6/1990 | Sakai et al. ................. 525/194 |
| 4,961,992 A | 10/1990 | Balloni et al. .............. 428/332 |
| 5,010,130 A | 4/1991 | Chapman et al. ........... 524/445 |
| 5,013,792 A | 5/1991 | Chapman et al. ........... 525/166 |
| 5,019,447 A | 5/1991 | Keller ........................ 428/327 |
| 5,057,177 A | 10/1991 | Balloni et al. ......... 156/244.11 |
| 5,057,575 A | 10/1991 | Chapman et al. ........... 525/199 |
| 5,106,911 A | 4/1992 | Chapman et al. ........... 525/199 |
| 5,132,368 A | 7/1992 | Chapman et al. ........... 525/165 |
| 5,266,639 A | 11/1993 | Chapman et al. ........... 525/200 |
| 5,374,683 A | 12/1994 | Morgan et al. ............. 525/200 |
| 5,587,429 A | 12/1996 | Priester ....................... 525/187 |
| 5,691,043 A | * 11/1997 | Keller et al. ................ 428/212 |
| 5,707,569 A | 1/1998 | Priester et al. ................ 264/39 |
| 5,827,615 A | 10/1998 | Touhsaent et al. .......... 428/463 |
| 5,885,721 A | * 3/1999 | Su et al. ..................... 428/516 |
| 6,048,608 A | * 4/2000 | Peet et al. ................ 428/315.5 |

\* cited by examiner

*Primary Examiner*—Mark Eashoo
(74) *Attorney, Agent, or Firm*—Rick F. James

(57) ABSTRACT

A method for producing an improved coextruded polymeric film is disclosed. First, a base layer containing a polymeric matrix and at least one additional layer on at least one side of the base layer are coextruded. If the coextruded polymeric film is to be opaque, the base layer also contains at least one cavitating agent. Next, the coextruded multi-layer film is cooled. Finally, the coextruded multi-layer film is oriented in at least the machine direction (MD). At least the base layer of the coextruded polymeric film contains a fluoropolymer. The inclusion of the fluoropolymer in at least the base layer of the coextruded polymeric film provides a more even distribution of polymer flow through a die, which in turns leads to improved film gauge uniformity.

19 Claims, No Drawings

US 6,632,383 B1

METHOD FOR PRODUCING IMPROVED POLYMERIC FILMS

RELATED APPLICATION

This application is a continuation-in-part of U.S. application Ser. No. 09/310,223, filed on May 12, 1999, now abandoned, which is incorporated herein by reference.

FIELD OF THE INVENTION

The present invention relates to a method for producing improved polymeric films. More particularly, this invention relates to a method for producing oriented polymeric films having improved gauge uniformity.

BACKGROUND OF THE INVENTION

Polymeric films having a polyolefin core layer, e.g., of an oriented isotactic polypropylene (OPP), have been widely used in food and non-food packaging applications, because such films have desirable properties, such as resistance to transmission of moisture, air, deleterious flavors, and the like, as well as outstanding mechanical properties.

However, during the production of, for example, an opaque polymeric film, uneven distribution of polymer flow through the die often occurs, and as a result, film products having inferior gauge (i.e., thickness) uniformity are obtained. In these conventional production processes, a significant percentage (e.g., 22%) of mill rolls of white opaque film often fails to achieve "superprime" quality classification. Further, in cases where polybutylene terephthalate (PBT) is used as the cavitating agent, PBT may degrade and build up in the film production equipment, forming deposits which further affect the flow patterns of molten polymer in the die.

We have now discovered that the addition of a relatively small amount of a fluoropolymer to a resin allows a more even distribution of polymer flow through a die, which in turn leads to improved gauge uniformity. In particular, the addition of a relatively small amount of a fluoropolymer to a resin leads to improved gauge uniformity by providing (i) better distribution and control of the base material and (ii) a better interfacial relationship between the base layer and any tie or skin layer material. In addition to this unexpected benefit, such a use of a relatively small amount of a fluoropolymer in the core layer reduces the build-up of degraded PBT and deposits therefrom.

U.S. Pat. No. 4,753,995 to Chu, et al. discloses that the extrudability of linear resins of ethylene into thin films is improved by adding small amounts (e.g., 0.02 to 2 weight percent) of polyvinylidene fluoride for reducing melt fracture and head pressure, and for providing films having reduced blocking.

U.S. Pat. No. 4,829,116 to Piesold discloses a polyolefin molding composition which contains a fluorine-containing polymer together with a wax. The patent states that the composition has a broad processing range in which no surface defects occur, and that the throughput on extrusion is greatly increased.

U.S. Pat. No. 4,904,735 to Chapman, Jr., et al. discloses a processing aid composition for difficultly melt-processable polymers, wherein the processing aid composition consists essentially of specific amounts of a particular fluorocarbon copolymer and specific amounts of a tetrafluoroethylene homopolymer or copolymer.

U.S. Pat. No. 4,931,499 to Sakai, et al. discloses a rubber composition obtained by subjecting a mixture of (I) 35–95 parts by weight of a fluoroelastomer and (II) 65–5 parts by weight of an ethylene-α-olefin copolymer rubber and a crosslinking agent for the copolymer rubber (III) to reaction while imparting shearing deformation to the mixture.

U.S. Pat. Nos. 5,010,130, 5,013,792, and 5,057,575 to Chapman, Jr., et al. disclose polymer blend compositions comprising (a) a major portion of difficultly-processable polymer and (b) a minor portion of (1) at least an effective amount of a particular fluorocarbon copolymer and (2) at least an effective amount of at least one tetrafluoroethylene homopolymer or copolymer.

U.S. Pat. No. 5,106,911 to Chapman, Jr., et al. discloses a polymer blend composition comprising: (a) a major portion of a difficultly-melt-processable hydrocarbon polymer; and (b) a minor portion of: (1) at least an effective amount of an elastomeric fluorocarbon copolymer; and (2)at least an effective amount of crystalline vinylidene fluoride polymer.

U.S. Pat. No. 5,132,368 to Chapman, Jr., et al. discloses a composition comprising a difficultly-melt-processable polymer and 0.002–0.5 wt % of one or more fluoropolymer process aids, wherein the fluoropolymer has a fluorine to carbon ratio of at least 1:2, is capable of forming a die-coating film under the prevailing conditions of extrusion temperature and pressure, and contains an effective amount of specific polar groups.

U.S. Pat. No. 5,266,639 to Chapman, Jr., et al. discloses tetrafluoroethylene/hexafluoropropylene (TFE/HFP) copolymers having a HFP index within a specifically selected range and having utility as processing aids in polyolefins and as solutions in highly-fluorinated solvents.

U.S. Pat. No. 5,374,683 to Morgan and U.S. Pat. No. 5,464,904 to Chapman, Jr., et al. disclose copolymers of tetrafluoroethylene (TFE) and hexafluoropropylene (HFP) having a high HFP content and an end-of-melting temperature as low as 200° C.

U.S. Pat. No. 5,587,429 to Priester discloses a processing aid system composition containing a fluoropolymer processing aid, a polar-side-group-containing extrusion adjuvant, and a poly(oxyalkylene) polymer to enhance extrusion of polyolefins.

U.S. Pat. No. 5,707,569 to Priester, et al. discloses polar-side-group-containing extrusion adjuvants that counteract the deleterious effect of certain additives used in polyolefins on the effectiveness of fluoropolymer processing aids in polyolefins.

U.S. Pat. No. 5,827,615 to Touhsaent, et al. discloses a metallized film substrate in which about 1 wt % of a fluoropolymer is used in a surface skin layer.

None of these patents, however, disclose a method for producing a polymeric film involving the addition of a relatively small amount of a fluoropolymer to a resin to provide a more even distribution of polymer flow through a die, which in turn leads to improved film gauge uniformity.

SUMMARY OF THE INVENTION

It is an object of the present invention to provide a more even flow of polymer through a die.

It is another object of the present invention to provide a method for producing a polymeric film having improved gauge uniformity.

It is yet another object of the present invention to provide a method for producing an opaque polymeric film having improved gauge uniformity, in which the build-up of degraded polybutylene terephthalate (PBT) is reduced.

In a first embodiment of the present invention, there is provided a method for producing a coextruded polymeric film comprising:

(a) coextruding (i) a base layer comprising a polymeric matrix; and (ii) at least one additional layer on at least one side of the base layer;

(b) cooling the coextruded multi-layer film; and then (c) orienting the film in at least the machine direction (MD);

wherein at least said base layer contains a fluoropolymer and said base layer does not contain a cavitating agent.

In a second embodiment of the present invention, there is provided a method for producing a coextruded, opaque polymeric film comprising:

(a) coextruding (i) a base layer comprising a polymeric matrix and at least one cavitating agent and (ii) at least one additional layer on at least one side of the base layer;

(b) cooling the coextruded multi-layer film; and then (c) orienting the film in at least the machine direction (MD);

wherein at least said base layer contains a fluoropolymer.

DETAILED DESCRIPTION OF THE INVENTION

The fluoropolymer used in the present invention may be any fluoropolymer which meets the objects of the present invention. Useful fluoropolymers include, but are not limited to, FX 9613, made by Dyneon, which is identified as a copolymer of vinylidene fluoride and hexafluoropropylene, and VITON A, made by E. I. Dupont de Nemours & Co., Inc.

Although the amount of fluoropolymer used may vary depending on the type of resin being modified, it is preferably used in an amount effective to provide a more even distribution of polymer flow through a die so as to provide an extruded web having improved gauge uniformity. Typically, such amounts can range from about 0.005 to about 3 weight percent, more preferably 0.01 to about 0.1 weight percent, based on the entire weight of the layer to which the fluoropolymer is added.

The fluoropolymer may be added to at least the base layer. Preferably, the fluoropolymer is included in the base layer.

The base layer of the polymer film comprises a polymeric matrix, which may be selected from any of the polymers previously used in the art for such purpose. In many cases, such a polymer is a polyolefin having a melting point, for example, of at least about 150° C. and up to, for example, about 167° C. Preferably, the polyolefin of the base layer has a relatively high degree of crystallinity. A particularly desirable polyolefin as the base layer polymer is an isotactic polypropylene homopolymer having a crystallinity of, for example, about 89 to 99% (as measured by $^{13}C$ NMR spectroscopy using meso pentads), a melting point of about 155 to about 165° C., and a melt index of about 0.5 to about 15 g/10 minutes (as measured by the standard ASTM D1238 methods).

Other suitable polymer matrix materials for the base layer include, but are not limited to, syndiotactic polypropylene, ethylene-propylene copolymers ethylene-propylene-butylene terpolymers, butylene-ethylene copolymers, functionally grafted copolymers, blends of copolymers, etc.

In one embodiment of the present invention, the base layer does not contain a cavitating agent.

A second embodiment of the present invention is directed to an opaque polymeric film. In order to produce a film which is opaque after being subjected to uniaxial or biaxial orientation as described hereinafter, at least one cavitating agent in the form of a dispersed phase may be provided in the base layer polymeric matrix material before extrusion and orientation of the film. Such dispersed phase comprises a material having a melting point that is higher than the melting point of and immiscible with the polymeric matrix material of the base layer, and may be any of those described in U.S. Pat. Nos. 4,377,616 and 4,632,869, the entire disclosures of which are incorporated herein by reference. Thus, the dispersed phase may be selected from a polymer such as a polyester (e.g., PBT or polybutylene terephthalate), nylon, an acrylic resin, or polystyrene, or an inorganic material such as glass, metal, or ceramic, or mixtures thereof. The preferred material for the dispersed phase is PBT. The particle size of the dispersed phase in the final film may be, for example, about 0.1 microns to about 5 microns, more preferably about 0.2 microns to about 2 microns. The dispersed phase may be present in the base layer in an amount of up to about 20 weight percent, preferably about 2 to about 12 weight percent, based on the entire weight of the base layer.

To preserve the structural integrity of the dispersed phase-containing base layer, a thin layer of the base layer polymeric matrix material without the dispersed phase may be coextruded on one or both sides of the dispersed phase-containing base layer polymeric matrix material. In this case, the total of the dispersed phase-containing polymer layer and the non-dispersed phase-containing layer(s) may be considered the overall base layer of the film. When such a polymer substrate is subjected to uniaxial or biaxial orientation, a cavity forms around the distributed dispersed phase moieties, providing a film having an opaque appearance.

The base layer of the present polymeric film is of sufficient thickness to provide bulk properties, such as barrier, stiffness, etc. that are desired for product protection and good performance on packaging equipment. Preferably, the thickness ranges from about 50% to about 100%, based on the thickness of the entire film structure.

Additional layer(s) of the present invention may be of any of the coextrudable, biaxially orientable film-forming resins known in the art. Such materials include, but are not limited to, syndiotactic polypropylene, low density polyethylene (LDPE), linear low density polyethylene (LLDPE), medium density polyethylene (MDPE), high density polyethylene (HDPE), ethylene-propylene copolymers, butylene-propylene copolymers, ethylene-butylene copolymers, ethylene-propylene-butylene terpolymers, ethylene-vinyl acetate copolymers, ethylene-vinyl alcohol copolymers, nylons, polymers grafted with functional groups, appropriate blends of these, and others known to those skilled in the art.

Each additional layer preferably has a range in thickness from about 0.005 mil to about 0.15 mil, preferably from about 0.02 mil to about 0.10 mil.

There can be more than one additional layer coextruded on each side of the base layer. That is, one or more layers can be added to the surface of the base layer. Films having such a multi-layer structure are represented, in simplified form, as having a structure "ABCDE" where "C" represents a base layer, "B" represents an additional layer adjacent to the base layer and "A" represents a further additional layer or skin layer applied to the outer surface of layer "B". In such a film structure, the additional layer "B" can be referred to as a "tie-layer" or an "intermediate layer." Layers "A" and "B" can be the same or different. Similarly, "D" and "E" represent additional layers on the other side of the base layer, and they may be the same or different. Layers "B" and "D" may be the same or different, and layers "A" and "E" may be the same or different. Additionally, structures containing more than five layers are contemplated, e.g., seven, nine, or more layers.

In order to modify or enhance certain properties of the multi-layer films of the present invention for specific end-uses, it is possible for one or more of the layers to contain appropriate additives in effective amounts. Preferred additives include, but are not limited to, anti-blocks, anti-static agents, coefficient of friction (COF) modifiers, processing aids, colorants, clarifiers, and other additives known to those skilled in the art.

Also, one or more of the exposed layers of the multi-layer films of the present invention can be surface-treated to render the films receptive to printing inks, adhesives and/or coatings. The surface treatment can be carried out by any method known in the art, such as corona discharge treatment or flame treatment.

Optionally, a coating may be applied to one or both of the exposed surfaces of the outermost layers of the film. Prior to application of the coating material, the film may be surface treated or may be primed with a primer layer. Appropriate coatings contemplated include, but are not limited to, acrylic coatings, such as those described in U.S. Pat. Nos. 3,753,769 and 4,865,908, both of which are incorporated herein by reference, and PVDC coatings, such as those described in U.S. Pat. Nos. 4,214,039; 4,447,494; 4,961,992; 5,019,447; and 5,057,177, all of which are incorporated herein by reference. A vinyl alcohol polymer may also be used as a coating composition, such as VINOL 325.

Appropriate primer materials are poly(ethyleneimine), epoxy primers, and the like.

The outer surface of the film is preferably treated as noted above to increase its surface energy and therefore insure that the coating layer will be strongly adherent thereto thereby reducing the possibility of the coating peeling or being stripped from the film. This treatment can be accomplished employing known techniques, such as, for example, film chlorination, i.e., exposure of the film surface to aqueous chlorine, treatment with oxidizing agents such as chromic acid, hot air or steam treatment, and the like. Although any of these techniques are effectively employed to pretreat the film surface, a particularly desirable method of treatment is the so-called corona treatment method which comprises exposing the film surface to a high voltage corona discharge while passing the film between a pair of spaced electrodes. After corona treatment of the film surface, the coating composition is then applied thereto.

The exposed treated or untreated surfaces of the inventive film may have applied to them coating compositions, as mentioned above, and/or substrates such as another polymer film or laminate; a metal foil such as aluminum foil; cellulosic webs, e.g., numerous varieties of paper such as corrugated paperboard, craft paper, glassine, cartonboard,; non-woven tissue, e.g., spunbonded polyolefin fiber, melt-blown microfibers; a metallizing layer, etc. The application may employ a suitable adhesive, e.g., a hot melt adhesive such as low density polyethylene, ethylene-methacrylate copolymer, water-based adhesives such as polyvinylidene chloride latex, and the like.

The extruded film can be stretched in the machine direction, coated with the coating composition and then stretched perpendicularly in the transverse direction. In yet another embodiment, the coating can be carried out after biaxial orientation is completed.

The coating composition should be applied in such amount that there will be deposited upon drying a smooth, evenly distributed layer, generally on the order of from about 0.01 to about 0.2 mil thickness (equivalent to about 0.2 to 3.5 g per 1000 sq. in. of film). Generally, the coating comprises 1 to 25 wt %, preferably 7 to 15 wt % of the entire coated film composition. The coating on the film is subsequently dried by hot air, radiant heat or by any other convenient means.

Usually the film of the invention has a total thickness ranging from about 0.2 mils to about 5 mils, specifically from about 0.4 mils to about 2.5 mils. The thickness relationship of the layers can be important. In particular, the base layer constitutes about 40 to about 100 percent of the total film thickness, the intermediate layer is of a thickness ranging from about 0 to about 30 percent of the total film thickness while an outer skin layer might range from about 0 to about 10 percent of the total film thickness.

Multi-layer films may be prepared employing commercially available systems for coextrusion.

It is preferred that all layers of the multi-layer film structures of the present invention be coextruded. Thereafter, the film is biaxially oriented. Specifically, the polymers are brought to the molten state and coextruded from a conventional extruder through a flat die sheet, the melt streams are combined in an adapter prior to being extruded from the die or within the die. After leaving the die, the multi-layer web is chilled and the quenched web is reheated and oriented. Preferably, the film is oriented by biaxially stretching the film. The film can be oriented by stretching from about 3 to about 11 times in the machine direction at temperatures ranging from about 105° C. to about 150° C. and from about 3 to about 12 times in the transverse direction (TD) at temperatures ranging from about 150° C. to about 165° C.

EXAMPLE

The effectiveness of the present invention without limiting the scope thereof, is illustrated by plant production data accumulated for a one year period prior to the introduction of a fluoropolymer to the core resin of a white opaque film product in comparison to production data for a nine month period immediately after the continuous introduction of 300 ppm fluoropolymer to the core resin of a white opaque film product. These data are shown in Table 1. These data are for the percentage of film produced which meets what is referred to as "superprime" film. The primary consideration for the "superprime" category is whether the film has a gauge uniformity deviation across the entire mill roll of film of less than ±1.5%.

The other properties of the opaque polymeric film were measured and were unaffected by the addition of the fluoropolymer.

TABLE 1

|  | % "Superprime" Film |
|---|---|
| 12 months production prior to use of fluoropolymer additive | 70.0 |
| 9 months production incorporating use of 300 ppm fluoropolymer additive | 79.8 |

As seen from Table 1, approximately 10% more of the film product met the requirements of superprime film when a suitable amount (e.g., 300 ppm) of fluoropolymer was present in the core resin.

What is claimed is:

1. A method for producing a coextruded, oriented opaque polymeric film comprising:
    (a) coextuding (i) a base layer comprising a polymeric matrix and at least one cavitating agent, (ii) at least one additional layer on a first side of the base layer, and (iii) at least one additional layer on a second side of the base layer;
    (b) cooling the coextruded multi-layer film; and then
    (c) orienting the film in at least the machine direction (MD);

wherein at least said base layer contains a fluoropolymer.

2. A method according to claim 1, wherein said fluoropolymer is present in an amount from about 0.005 to about 3 weight percent, based on the total weight of the base layer.

3. A method according to claim 1, wherein said fluoropolymer is a copolymer of vinylidene fluoride and hexafluoropropylene.

4. A method according to claim 1, wherein said polymeric matrix is a polyolefin.

5. A method according to claim 4, wherein said polyolefin is an isotactic polypropylene.

6. A method according to claim 5, wherein said at least one cavitating agent is in the form of a dispersed phase selected from the group consisting of polyester, nylon, acrylic resin, polystyrene, glass, metal, ceramic, and mixtures thereof.

7. A method according to claim 6, wherein said cavitating agent is a polyester.

8. A method according to claim 7, wherein said polyester is polybutylene terephthalate.

9. A method according to claim 1, wherein said at least one additional layer on the first side of the base layer comprises a polymer selected from the group consisting of low density polyethylene (LDPE), linear low density polyethylene (LLDPE), medium density polyethylene (MDPE), high density polyethylene (HDPE), ethylene-propylene copolymers, butylene-propylene copolymers, ethylene-butylene copolymers, ethylene-propylene-butylene terpolymers, ethylene-vinyl acetate copolymers, ethylene-vinyl alcohol copolymers, nylons, polymers grafted with functional groups, and blends thereof.

10. A method according to claim 1, wherein said base layer constitutes from about 40 to about 100 percent of the total film thickness.

11. A method for producing a coextruded, oriented polymeric film comprising:
    (a) coextruding (i) a base layer comprising a polymeric matrix, (ii) at least one additional layer on a first side of the base layer, and (iii) at least one additional layer on a second side of the base layer;
    (b) cooling the coextruded multi-layer film; and then
    (c) orienting the film in at least the machine direction (MD);

wherein at least said base layer contains a fluoropolymer and said base layer does not contain a cavitating agent.

12. A method according to claim 11, wherein said fluoropolymer is present in an amount from about 0.005 to about 3 weight percent, based on the total weight of the base layer.

13. A method according to claim 11, wherein said fluoropolymer is a copolymer of vinylidene fluoride and hexafluoropropylene.

14. A method according to claim 11, wherein said polymeric matrix is a polyolefin.

15. A method according to claim 14, wherein said polyolefin is an isotactic polypropylene.

16. A method according to claim 11, wherein said at least one additional layer on the first side of the base layer comprises a polymer selected from the group consisting of low density polyethylene (LDPE), linear low density polyethylene (LLDPE), medium density polyethylene (MDPE), high density polyethylene (HDPE), ethylene-propylene copolymers, butylene-propylene copolymers, ethylene-butylene copolymers, ethylene-propylene-butylene terpolymers, ethylene-vinyl acetate copolymers, ethylene-vinyl alcohol copolymers, nylons, polymers grafted with functional groups, and blends thereof.

17. A method according to claim 11, wherein said base layer constitutes from about 40 to about 100 percent of the total film thickness.

18. A method according to claim 1, wherein only the base layer contains the fluoropolymer.

19. A method according to claim 11, wherein only the base layer contains the fluoropolymer.

* * * * *